United States Patent
Hsiao (10) Patent No.: US 9,075,707 B2
(45) Date of Patent: Jul. 7, 2015

(54) DATA WRITING METHOD AND DATA STORAGE DEVICE

(75) Inventor: Wei-Yi Hsiao, Kaohsiung (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 1019 days.

(21) Appl. No.: 13/088,553

(22) Filed: Apr. 18, 2011

(65) Prior Publication Data
US 2011/0264847 A1    Oct. 27, 2011

(30) Foreign Application Priority Data

Apr. 21, 2010 (TW) ............... 99112467 A (51) Int. Cl.
*G06F 12/02* (2006.01)

(52) U.S. Cl.
CPC .... *G06F 12/0246* (2013.01); *G06F 2212/7202* (2013.01); *G06F 2212/7211* (2013.01)

(58) Field of Classification Search
CPC .................................................. G06F 12/0246
USPC .................................................. 711/103, 115
See application file for complete search history.

(56) References Cited

U.S. PATENT DOCUMENTS

| | | | |
|---|---|---|---|
| 7,984,231 B2 * | 7/2011 | Maeda et al. | 711/103 |
| 8,117,382 B2 | 2/2012 | Yeh et al. | |
| 8,606,987 B2 | 12/2013 | Yang et al. | |
| 2003/0227804 A1 * | 12/2003 | Lofgren et al. | 365/200 |
| 2008/0177927 A1 | 7/2008 | Hsiao et al. | |
| 2009/0089485 A1 * | 4/2009 | Yeh | 711/103 |
| 2009/0106484 A1 | 4/2009 | Yeh et al. | |
| 2009/0122949 A1 * | 5/2009 | Reid et al. | 377/15 |
| 2009/0164702 A1 * | 6/2009 | Kern | 711/103 |
| 2009/0172255 A1 * | 7/2009 | Yeh et al. | 711/103 |
| 2009/0198875 A1 | 8/2009 | Chu et al. | |
| 2009/0265505 A1 | 10/2009 | Yang et al. | |
| 2010/0017555 A1 | 1/2010 | Chang et al. | |

(Continued)

FOREIGN PATENT DOCUMENTS

| | | |
|---|---|---|
| TW | 200919474 | 5/2009 |
| TW | 200926183 | 6/2009 |
| TW | 200926196 | 6/2009 |

OTHER PUBLICATIONS

Zertal, S., Harrison, P.G. Investigating Flash Memory Wear Levelling and Execution Codes. Jul. 13-16, 2009. Performance Evaluation of Computer & Telecommunication Systems, 2009. SPECTS 2009. International Symposium on (vol. 41). pp. 81-88.*

(Continued)

*Primary Examiner* — Michael Jung
*Assistant Examiner* — Mikka Liu
(74) *Attorney, Agent, or Firm* — McClure, Qualey & Rodack, LLP (57) ABSTRACT

The invention provides a data writing method for a memory. In one embodiment, the memory comprises a data area and a spare area, the data area comprises a plurality of data blocks storing data, and the spare area comprises a plurality of spare blocks having no data stored therein. First, a write command for writing a write data to a first data block of the memory is received from a host. The spare blocks of the spare area are then sorted according to the erase counts of the spare blocks. A first spare block with the least erase counts is then selected from the spare blocks of the spare area. The write data is then written to the first spare block. Data is then erased from the first data block to convert the first data block to a spare block.

6 Claims, 7 Drawing Sheets

(56) References Cited

U.S. PATENT DOCUMENTS

2010/0023675 A1* 1/2010 Chen et al. ............... 711/103
2010/0077132 A1 3/2010 Hung
2010/0115194 A1* 5/2010 Suzuki ..................... 711/103

OTHER PUBLICATIONS

Chang, L., Du, C. Design and Implementation of an Efficient Wear-Leveling Algorithm for Solid-State-Disk Microcontrollers. Dec. 2009. ACM Transactions on Design Automation of Electronic Systems (TODAES) TODAES Homepage archive vol. 15 Issue 1, Dec. 2009 Article No. 6.*

English language translation of abstract of TW 200919474 (published May 1, 2009).

English language translation of abstract of TW 200926183 (published Jun. 16, 2009).

English language translation of abstract of TW 200926196 (published Jun. 16, 2009).

* cited by examiner

DATA WRITING METHOD AND DATA STORAGE DEVICE

CROSS REFERENCE TO RELATED APPLICATIONS

This Application claims priority of Taiwan Patent Application No. 99112467, filed on Apr. 21, 2010, the entirety of which is incorporated by reference herein.

BACKGROUND OF THE INVENTION

1. Field of the Invention

The invention relates to memories, and more particularly to flash memories.

2. Description of the Related Art

A flash memory comprises a plurality of blocks. Each block comprises a plurality of pages for data storage. Each block also maps to a unique address. When a host wants to access data stored in the flash memory, the host sends an access command to a controller of the flash memory, wherein the access command comprises an address of the block storing the data to be accessed. The controller then accesses data from the flash memory according to the address. For example, when the flash memory receives a write command from the controller, the flash memory writes data to the block corresponding to the address. When the flash memory receives a read command from the controller, the flash memory reads data from the block corresponding to the address and sends the read data back to the controller.

After data is written to all pages of a block of a flash memory, other data cannot be written to the block again. A plurality of blocks of a flash memory is therefore divided into data blocks of a data area and spare blocks of a spare area. Data blocks of the data area have stored data, and spare blocks of the spare area have no stored data. When the host wants to write data into a write address corresponding to a data block of the data area, because update data cannot be written to the data block again, the controller obtains a spare block from the spare area, changes the address of the spare block to the write address, and then writes the update data to the spare block. Because the data block originally mapped to the write address is useless, the controller erases data from the data block to convert the data block to a spare block.

Figure 2:
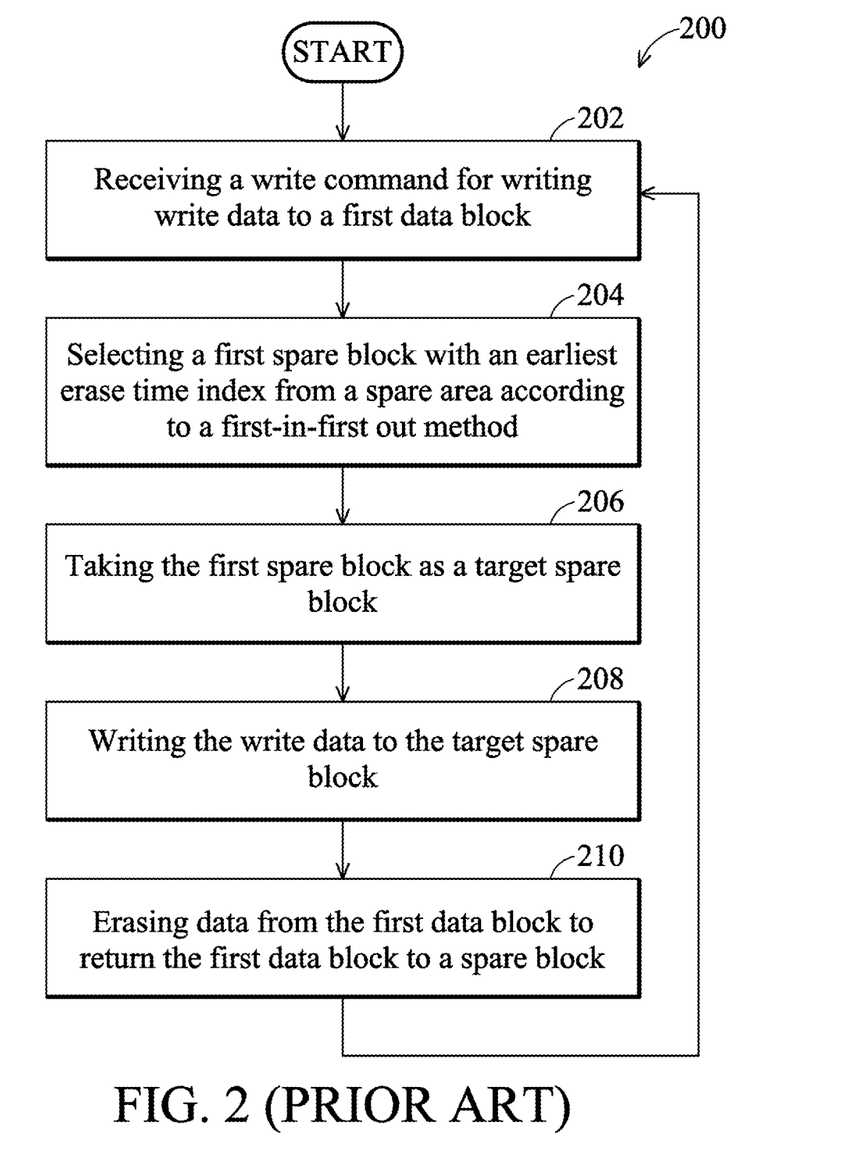
FIG. 2 is a flowchart of a conventional data writing method.

Ordinarily, when a controller selects a spare block from the spare area, a first-in first-out (FIFO) method is used to select the spare block. In other words, the controller selects a spare block with the earliest erase time index in comparison with those of other spare blocks from the spare area. Referring to FIG. 2, a flowchart of a conventional data writing method 200 is shown. First, the controller receives a write command from a host (step 202). Assume that the write command requests the controller to write a write data to a first data block of the flash memory. Because the first data block has stored data, the controller cannot write the write data to the first data block. The controller therefore must obtain a target spare block for storing the write data in place of the first data block from the spare area of the flash memory. According to the first-in first-out method, the controller selects a first spare block with the earliest erase time index from the spare blocks of the spare area of the flash memory (step 204). The controller then takes the first spare block as the target spare block to hold the write data (step 206), and then controls the flash memory to write the write data to the target spare block (step 208). The target spare block therefore becomes a data block holding the write data in place of the first data block. The first data block holds old-version data and is useless. The controller therefore erases the old-version data from the first data block to convert the first data block to a spare block (step 210).

Figure 1A:
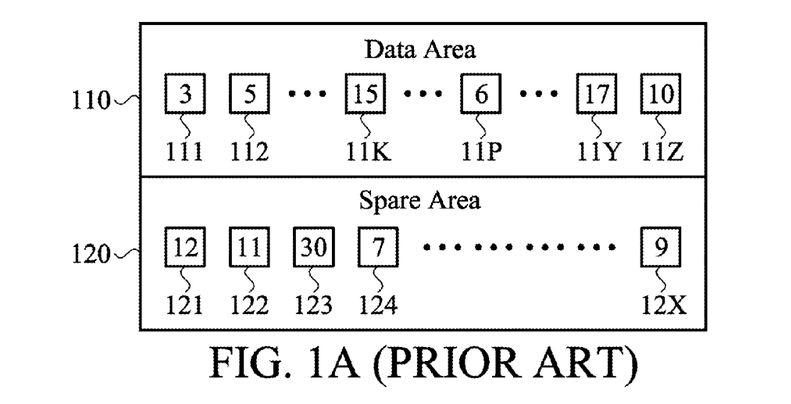
FIGS. 1A, 1B, and 1C are schematic diagrams of an embodiment of a conventional data writing method.
Figure 1B:
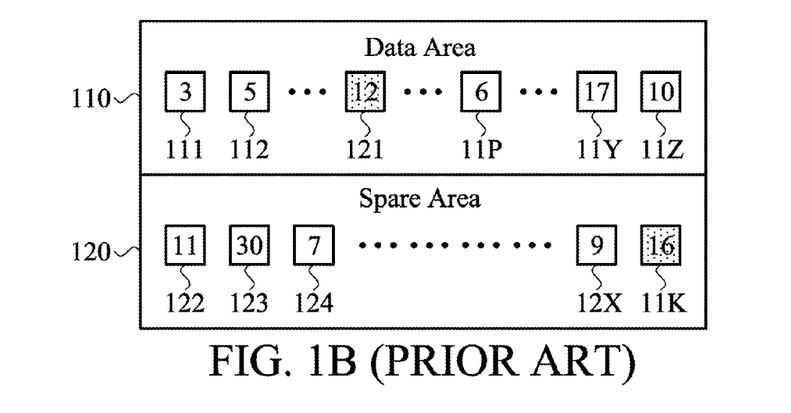
Figure 1C:
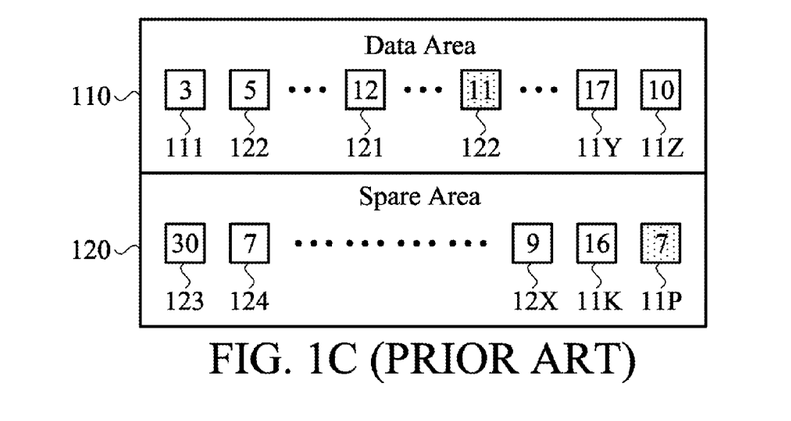

Referring to FIGS. 1A-1C, schematic diagrams of an embodiment of a conventional data writing method are shown. As shown in FIG. 1A, a data area 110 comprises data blocks 111, 112, 11K, 11P, 11Y, and 11Z which respectively have erase counts of 3, 5, 15, 6, 17, and 10. The spare area 120 comprises spare blocks 121, 122, 123, 124, and 12X which respectively have erase counts of 12, 11, 30, 7, and 9. Assume that a controller receives a write command for writing update data to the data block 11K of the data area 110. Because the update data cannot be written to the data block 11K which has stored data, the controller selects a spare block 121 with the earliest erase time index from the spare area 120 to hold the update data in place of the data block 11K. After the spare block 121 stores the update data, the spare block 121 is moved to the data area 110, as shown in FIG. 1B. Data is then erased from the data block 11K, wherein the erase count of the data block 11K is increased from 15 to 16, and the data block 11K having no data stored therein is then moved to the spare area 120, as shown in FIG. 1B. Assume that the controller further receives a write command for writing second update data to the data block 11P of the data area 110. Because the second update data cannot be written to the data block 11P which has stored data, the controller selects a spare block 122 with the earliest erase time index from the spare area 120 to hold the second update data in place of the data block 11P. After the spare block 122 stores the second update data, the spare block 122 is moved to the data area 110, as shown in FIG. 1C. Data is then erased from the data block 11P, wherein the erase count of the data block 11P is increased from 6 to 7, and the data block 11P having no data stored therein is then moved to the spare area 120, as shown in FIG. 1C.

Figure 3A:
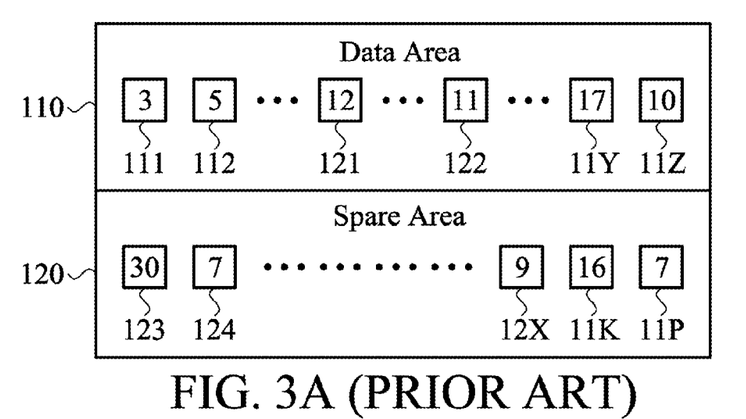
FIGS. 3A and 3B are schematic diagrams of an embodiment of over-wearing of blocks according to a conventional data writing method.
Figure 3B:
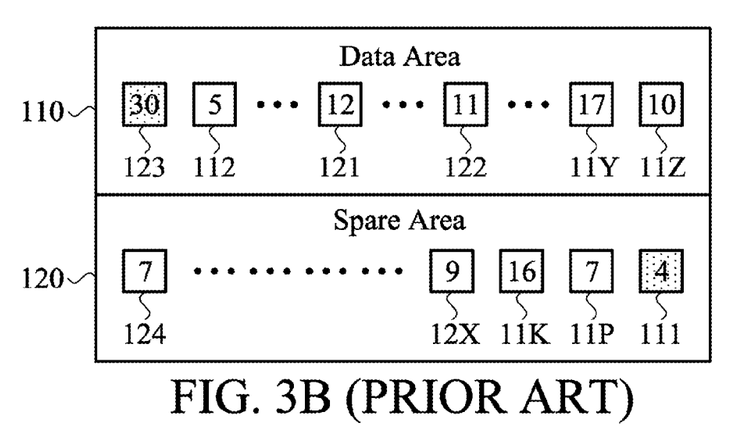

The conventional data writing method 200 shown in FIG. 2, however, has a deficiency. Because the controller selects the target spare block for holding update data from the spare area according to only the first-in first-out method (step 204), the controller may obtain a target spare block with a high erase count. When the target spare block with a high erase count is used to store update data, wherein the erase count of the target spare block is rapidly increased, the risk of over-wearing the target spare block is increased. Referring to FIGS. 3A and 3B, schematic diagrams of an embodiment of over-wearing of blocks according to a conventional data writing method are shown. In FIG. 3A, assume that the controller receives a writing command for writing update data to a data block 111 of a data area 110. Because the update data cannot be written to the data block 111 which has stored data, the controller selects a spare block 123 with the earliest erase time index from the spare area 120 to hold the update data in place of the data block 111. After the spare block 123 stores the update data, the spare block 123 is moved to the data area 110, as shown in FIG. 3B. Data is then erased from the data block 111, wherein the erase count of the data block 111 is increased from 3 to 4, and the data block 111 having no data stored therein is then moved to the spare area 120, as shown in FIG. 3B. The block 123 with a high erase count of 30 is still used to store update data. When data is erased from the block 123 again, wherein the erase count of the block 123 is further increased to 31, and a risk of identifying the block 123 as a worn-out block is increased. To solve the aforementioned problem, a new data writing method is required.

BRIEF SUMMARY OF THE INVENTION

The invention provides a data writing method for a memory. In one embodiment, the memory comprises a data area and a spare area, the data area comprises a plurality of data blocks storing data, and the spare area comprises a plurality of spare blocks having no data stored therein. First, a write command for writing a write data to a first data block of the memory is received from a host. The spare blocks of the spare area are then sorted according to the erase counts of the spare blocks. A first spare block with the least erase counts is then selected from the spare blocks of the spare area. The write data is then written to the first spare block. Data is then erased from the first data block to convert the first data block to a spare block.

The invention also provides a data storage device. In one embodiment, the data storage device comprises a memory and a controller. The memory comprises a data area and a spare area, wherein the data area comprises a plurality of data blocks storing data, and the spare area comprises a plurality of spare blocks having no data stored therein. The controller receives a write command for writing a write data to a first data block of the memory from a host, sorts the spare blocks of the spare area according to the erase counts of the spare blocks, selects a first spare block with the least erase counts from the spare blocks of the spare area, writes the write data to the first spare block, and erases data from the first data block to convert the first data block to a spare block.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
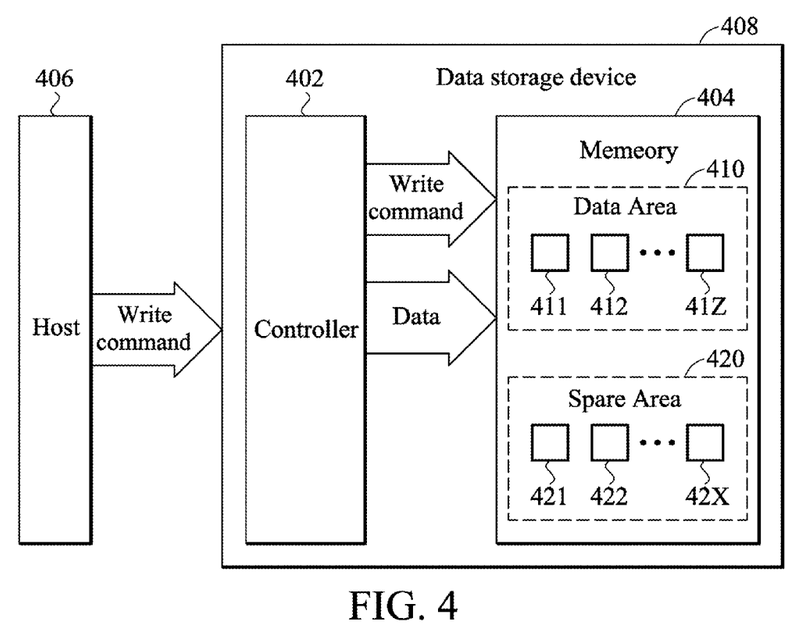
FIG. 4 is a block diagram of a data storage device according to the invention.

Referring to FIG. 4, a block diagram of a data storage device 408 according to the invention is shown. The data storage device 408 is coupled to a host 406, and comprises a controller 402 and a memory 404. In one embodiment, the memory 404 is a flash memory. The memory 404 comprises a plurality of blocks for data storage. The blocks of the memory 404 are divided into two groups. A data area 410 contains data blocks 411, 412, . . . , 41Z which have stored data. A spare area 420 contains spare blocks 421, 422, . . . , 42X which do not have stored data. The controller 402 receives access commands from the host 406, and accesses data stored in the memory 404 according to the access commands.

When the controller 402 receives a write command from the host 406, the controller 402 searches the memory 404 for a block corresponding to the address comprised by the write command. If the block corresponding to the address is a data block of the data area 410, because the data block has stored data, the controller 402 cannot write update data to the data block. The controller 402 then obtains a target spare block from the spare area 420 for storing the update data in place of the data block. When the controller selects a spare block as the target spare block, the controller first sorts all of the spare blocks in the spare area 420, and then selects the spare block with the least erase counts in comparison with those of other spare blocks in the spare area 420 as the target spare block. Thus, whenever the controller 402 executes a write command for writing update data to a data block, the controller 402 always selects a spare block with the least erase counts from the spare area 420 as a target spare block for storing the update data in place of the data block. The controller 402 therefore avoids the use of a spare block with a higher erase count for holding update data of a data block, thereby lowering the risk of increasing a total number of the worn-out blocks. Thus, lifespan of the memory 404 of the data storage device 408 is lengthened, and the performance of the data storage device 408 is improved.

Figure 5:
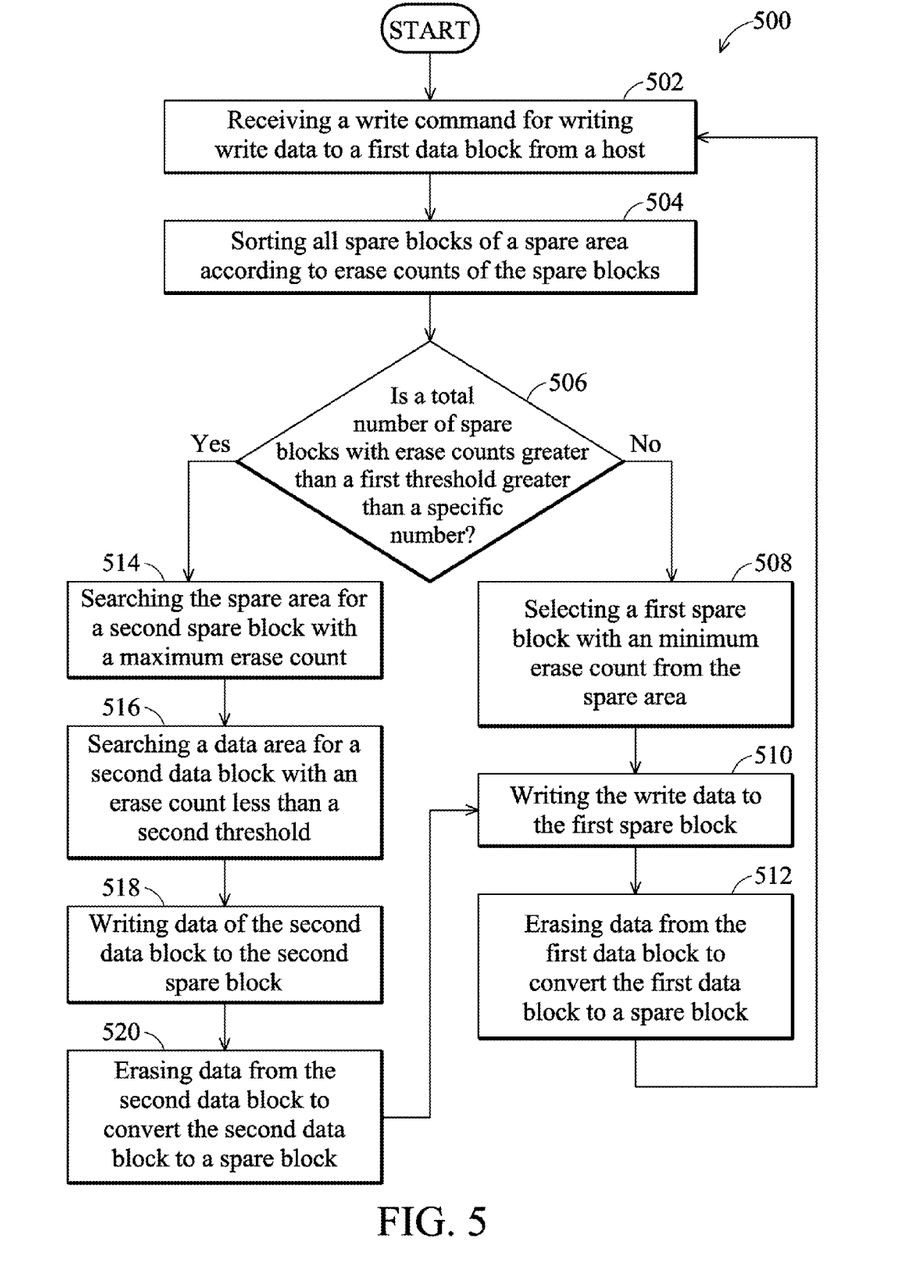
FIG. 5 is a flowchart of a data writing method according to the invention.

Referring to FIG. 5, a flowchart of a data writing method 500 according to the invention is shown. First, the controller 402 receives a write command from the host 406 (step 502). Assume that the write command requests the controller 402 to write a write data to a write address which is mapped to a first data block of the data area 410 of the memory 404. Because the first data block has stored data, the controller 402 therefore cannot write the write data to the first data block. The controller 402 therefore obtains a target spare block from the spare area 420 to hold the write data in place of the first data block. First, the controller 402 sorts all of the spare blocks in the spare area 420 according to the erase counts of the spare blocks (step 504). The controller 402 then calculates a total number of spare blocks with erase counts greater than a first threshold (step 506). The spare blocks with erase counts greater than the first threshold are referred to as worn-out blocks. When the total number of the worn-out blocks of the spare area 420 is greater than a specific number (step 506), the controller 402 performs a wear-leveling process, which is further illustrated with FIGS. 7A and 7B. The controller 402 then selects a first spare block with the least erase counts in comparison with those of other spare blocks from the spare area 420 (step 508), and determines the first spare block to be the target spare block for holding the write data in place of the first data block. The controller 402 then writes the write data to the target spare block (step 510), and sets the logical address of the first spare block to be the write address. The first data block storing old-version data is therefore useless and has been replaced by the first spare block. The controller 402 then erases data from the first data block to convert the first data block to a spare block (step 512).

Figure 6A:
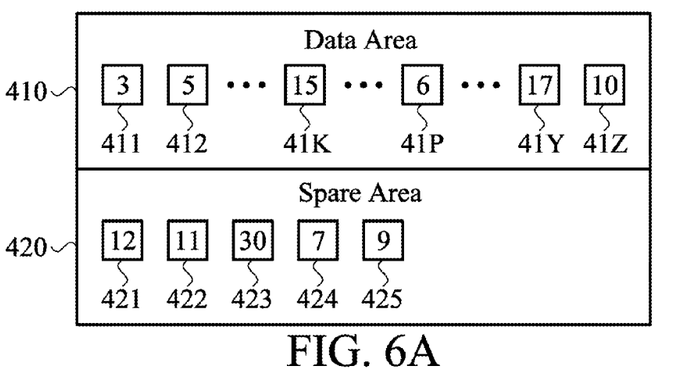
FIGS. 6A, 6B, and 6C are schematic diagrams of an embodiment of data writing of the flash memory according to the invention.
Figure 6B:
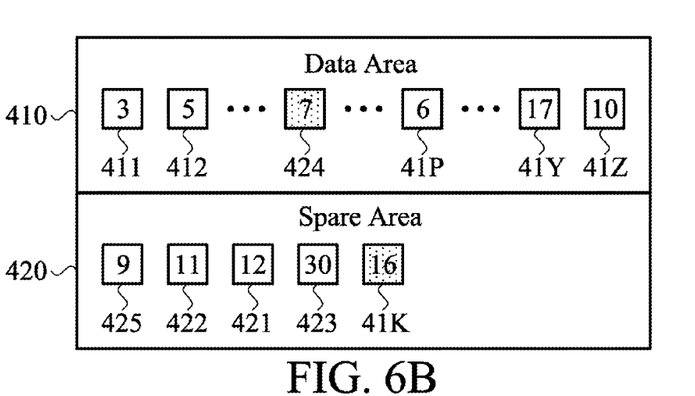

Referring to FIGS. 6A~6C, schematic diagrams of an embodiment of data writing of the flash memory 404 according to the invention are shown. As shown in FIG. 6A, a data area 410 comprises data blocks 411, 412, 41K, 41P, 41Y, and 41Z which respectively have erase counts of 3, 5, 15, 6, 17, and 10. The spare area 420 comprises spare blocks 421, 422, 423, 424, and 425 which respectively have erase counts of 12, 11, 30, 7, and 9. Assume that the controller 402 receives a write command for writing update data to the data block 41K of the data area 410. Because the update data cannot be written to the data block 41K which has stored data, the controller 402 sorts the spare blocks of the spare area 420 according to the erase counts of the spare blocks. After the spare blocks are sorted, it is determined that the spare block 424 has the least erase counts 7 in comparison with those of the other spare blocks of the spare area 420. The controller 402 then selects the spare block 424 according to the method 500 as a target spare block to hold the update data in place of the data block 41K. The update data is then written to the target spare block 424. After the spare block 424 stores the update data, the spare block 424 is moved to the data area 410, as shown in FIG. 6B. Data is then erased from the data block 41K, wherein the erase count of the data block 41K is increased from 15 to 16, and the data block 41K having no data stored therein is then moved to the spare area 420, as shown in FIG. 6B.

Figure 6C:
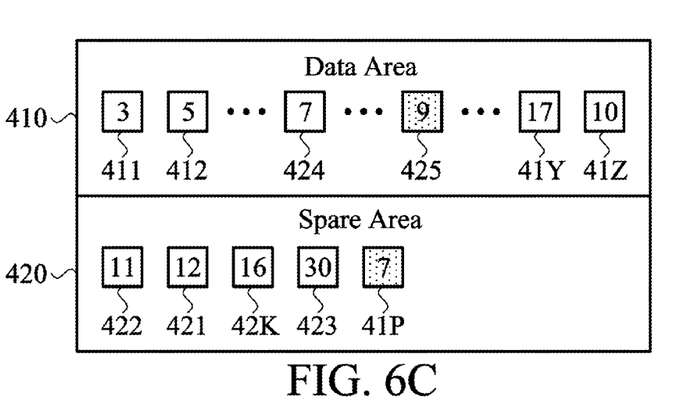

Assume that the controller 402 further receives a write command for writing second update data to the data block 41P of the data area 410. Because the second update data cannot be written to the data block 41P which has stored data, the controller 402 sorts the spare blocks of the spare area 420 according to the erase counts of the spare blocks, and selects a spare block 425 with the least amount of erase counts 9 from the spare area 420 to hold the second update data in place of the data block 41P. The controller 402 then writes the second update data to the target spare block 425. After the spare block 425 stores the second update data, the spare block 425 is moved to the data area 410, as shown in FIG. 6C. Data is then erased from the data block 41P, wherein the erase count of the data block 41P is increased from 6 to 7, and the data block 41P having no data stored therein is then moved to the spare area 420, as shown in FIG. 6C.

The wear-leveling process of the method 500 is illustrated in the following. At step 506, the controller 402 calculates a total number of worn-out blocks in the spare area 420, and determines whether the total number of the worn-out blocks is greater than the specific number. If the total number of the worn-out blocks is greater than the specific number, the controller 402 searches the data area 410 for at least one data block with a low erase count to replace at least one spare block with a high erase count in the spare area 420. In one embodiment, the specific number is a natural number greater than 2. If the total number of the worn-out blocks is greater than the specific number (step 506), the controller 402 searches the spare area 420 for a second spare block with the largest erase count (step 514). The controller 402 then searches the data area 410 for a second data block with an erase count less than a second threshold (step 516). In one embodiment, the second threshold is lower than half of the first threshold. The controller 402 then writes the data of the second data block to the second spare block (step 518), sets the address of the second spare block to the logical address of the second data block, and then moves the second spare block to the data area 410. The second data block is now replaced by the second spare block. The controller 402 then erases data from the second data block to convert the second data block to a spare block (step 520). The description of the wear-leveling process comprising steps 514~520 is now completed.

Figure 7A:
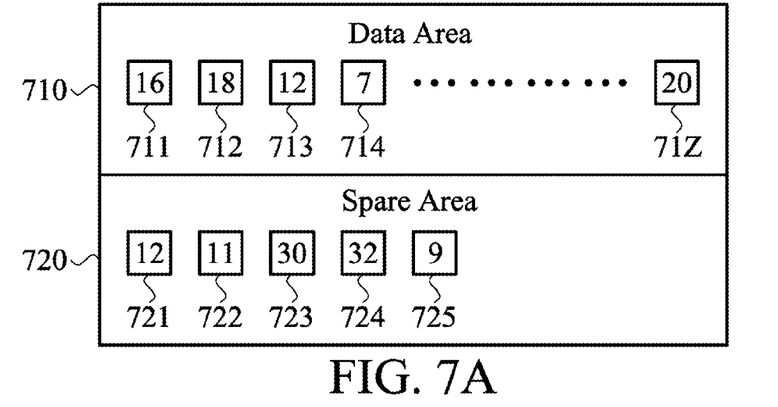
FIGS. 7A and 7B are schematic diagrams of an embodiment of a wear-leveling process of the flash memory according to the invention.

Referring to FIGS. 7A~7B, they are schematic diagrams of an embodiment of a wear-leveling process of the flash memory according to the invention. As shown in FIG. 7A, a data area 710 comprises data blocks 711, 712, 713, 714, and 71Z which respectively have erase counts of 16, 18, 12, 7, and 20. The spare area 720 comprises spare blocks 721, 722, 723, 724, and 725 which respectively have erase counts of 12, 11, 30, 32, and 9. Assume that a spare block with an erase count greater than or equal to 30 is determined to be a worn-out block. When the controller 402 searches the spare area 710 for worn-out blocks, two worn-out blocks 723 and 724 with erase counts 30 and 32 are found in the spare area 720. Assume that the specific number in step 506 is equal to 2. The total number of the worn-out blocks of the spare area 720 is therefore equal to the specific number, and the controller 402 must perform a wear-leveling process to lower the total number of the worn-out blocks of the spare area 720.

Figure 7B:
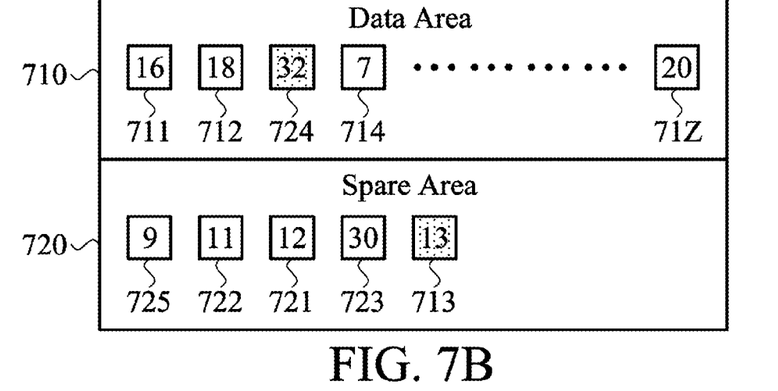

The controller 402 first selects a spare block 724 with the largest erase count 32 from the spare area 720 for replacement with data blocks of the data area 710. The controller 402 then searches a data block 713 with an erase count 12 lower than a second threshold 15 for replacement with the spare block 724. The controller 402 then writes the data of the data block 713 to the spare block 724, sets the address of the spare block 724 to the logical address of the data block 713, and moves the spare block 724 to the data area 710, as shown in FIG. 7B. The controller 402 then erases data from the data block 713 to convert the data block 713 to a spare block, and then moves the data block 713 to the spare area 720, as shown in FIG. 7B. The worn-out spare block 724 with a high erase count 32 is therefore replaced with the data block 713 with a low erase count 13, and a total number of the worn-out blocks of the spare area 720 is therefore reduced.

When the controller 402 performs the wear-leveling process at step 518, if the erase counts of all data blocks of the data area 410 are greater than the second threshold, the controller 402 can not find a data block with an erase count less than the second threshold in the data area 410. The controller 402 then subtracts a value from the erase counts of all data blocks of the data area 410, thereby decreasing the erase counts of all data blocks of the data area 410. In one embodiment, the value is equal to half of the first threshold or the second threshold. When the erase counts of the data blocks of the data area 710 are decreased, the controller 402 can then search the data area 410 for data blocks with erase counts less than the second threshold again to perform the wear-leveling process.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data writing method for a memory, wherein the memory comprises a data area and a spare area, the data area comprises a plurality of data blocks storing data, and the spare area comprises a plurality of spare blocks having no data stored therein, comprising:

receiving a write command for writing a write data to a first data block of the memory from a host;

sorting the plurality of spare blocks of the spare area according to erase counts of the plurality of spare blocks;

calculating a total number of worn-out blocks in the spare area, wherein erase counts of the worn-out blocks are greater than a first threshold;

checking whether the total number of the worn-out blocks is greater than a specific number, wherein the specific number is equal to two;

if the total number of the worn-out blocks is greater than the specific number, performing a wear-leveling process to swap the worn-out blocks in the spare area for the data blocks in the data area;

selecting a first spare block with the least erase counts from the plurality of spare blocks of the spare area;

writing the write data to the first spare block; and erasing data from the first data block to convert the first data block to a spare block, wherein the performing of the wear-leveling process comprises:

selecting a second spare block with the largest erase count from the worn-out blocks of the spare area;

obtaining a second data block with an erase count less than a second threshold from the data area;

writing data stored in the second data block to the second spare block; and erasing data from the second data block to convert the second data block to a spare block, wherein obtaining of the second data block comprises:

when the data area does not comprise any data blocks with erase counts less than the second threshold, subtracting a predetermined number from the erase counts of all data blocks of the data area; and searching the data area for the second data block with an erase count less than the second threshold.

2. The data writing method as claimed in claim 1, wherein the second threshold is equal to half of the first threshold.

3. The data writing method as claimed in claim 1, wherein the predetermined number is equal to half of the first threshold.

4. A data storage device, comprising:

a memory, comprising a data area and a spare area, wherein the data area comprises a plurality of data blocks storing data, and the spare area comprises a plurality of spare blocks having no data stored therein; and a controller, receiving a write command for writing a write data to a first data block of the memory from a host, sorting the plurality of spare blocks of the spare area according to erase counts of the plurality of spare blocks, selecting a first spare block with the least erase counts from the plurality of spare blocks of the spare area, writing the write data to the first spare block, and erasing data from the first data block to convert the first data block to a spare block, wherein the controller calculates a total number of worn-out blocks with erase counts greater than a first threshold in the spare area, checks whether the total number of the worn-out blocks is greater than a specific number, and performs a wear-leveling process to swap the worn-out blocks in the spare area for the data blocks in the data area if the total number of the worn-out blocks is greater than the specific number, wherein the specific number is equal to two, wherein when the controller performs of the wear-leveling process, the controller selects a second spare block with the largest erase count from the worn-out blocks of the spare area, obtains a second data block with an erase count less than a second threshold from the data area, writes data stored in the second data block to the second spare block, and erases data from the second data block to convert the second data block to a spare block, wherein when the controller searches the data area for the second data block, if the data area does not comprise any data blocks with erase counts less than the second threshold, the controller subtracts a predetermined number from the erase counts of all data blocks of the data area, and then searches the data area for the second data block with an erase count less than the second threshold again.

5. The data storage device as claimed in claim 4, wherein the second threshold is equal to half of the first threshold.

6. The data storage device as claimed in claim 4, wherein the predetermined number is equal to half of the first threshold.

* * * * *